United States Patent Office 3,160,607
Patented Dec. 8, 1964

3,160,607
PROCESS FOR PRODUCING POLYMER BEADS FROM ACROLEINS USING PIPERIDINE AS SOLE CATALYST
Karl-Heinz Rink, Hanau am Main, Germany, assignor to Deutsche Gold- und Silber-Scheideanstalt vormals Roessler, Frankfurt am Main, Germany
No Drawing. Filed Sept. 1, 1961, Ser. No. 135,456
Claims priority, application Germany, Sept. 3, 1960, D 34,164
5 Claims. (Cl. 260—67)

The present invention relates to production of polymer beads from acroleins. More particularly it is directed to polymerization of acrolein or alpha substituted acrolein, or copolymerization of these monomers with another vinyl monomer under specific conditions to produce polymer beads.

It is known to produce polymer beads employing appropriate types of polymerization conditions and certain vinyl monomers containing the structure $CH_2=C<$, such as, for example, methyl methacrylate or styrene. As prerequisites for these known methods for the production of polymer beads the insoluble monomer is dispersed with the aid of a dispersing agent and the resulting polymer is dissolved in the monomer. These prerequisites had to be met in the preparation of methyl methacrylate and styrene polymer beads.

In evaluating acrolein on the basis of these theoretical prerequisites for the production of polymer beads, it would seem nearly impossible to obtain polyacrolein beads because the acrolein monomer does not tend to dissolve polyacrolein and monomeric acrolein dissolves to a considerable extent—up to 20%—in water.

It was unexpectedly found that polymer beads of such monomers as acrolein, alpha-substituted acrolein, such as alpha-methyl acrolein and alpha-ethyl acrolein, and mixtures of acrolein with other vinyl monomers (containing a $CH_2=C<$ group) may be prepared in a simple manner when one carries out the polymerization under certain specific conditions. The conditions that are necessary individually for the successful production of acrolein polymer beads are known per se in the general production of acrolein polymers. The combination of these individually known measures, namely, the use of an alkaline compound as catalyst, polymerization in the presence of water together with the use of an emulsifier, and thorough blending of the polymerization reactants yields the desired polyacrolein beads. Evidently the determining factor for the success of the process according to the invention for the production of acrolein polymer beads lies in the fact that the polymerization is carried to completion in relatively short time with the aid of a basic catalyst.

The finely divided monomeric acrolein particles which are in the form of spherical droplets because of the stirring and the presence of the dispersing agent are polymerized almost immediately as a whole, thereby retaining the spherical shape in the resulting polymer beads. Such acrolein polymer beads are transparent and almost optically clear.

Suitable catalysts for carrying out the polymerization of this invention with which the polymerization can be carried out in significantly shorter time, mostly in less than an hour, are organic or inorganic alkaline reagents, such as aliphatic amines, for example, triethylamine, diethylamine, triethanolamine, ethylenediamine, hexamethylene diamine and others, or such inorganic compounds as sodium hydroxide, sodium carbonate, ammonia, hydrazine and others. The preferred catalyst for preparing polymer beads of the acroleins is piperidine. This may be used in an amount of 0.001 to 5% by weight, preferably 0.05% by weight, based on the amount of acroleins polymerized.

The dispersing agents which are used are commonly employed for the production of polymer beads from other monomers, such as, for example, organic water soluble polymers like polyvinyl alcohol, polyacrylic acid and polymethacrylic acid salts, and cellulose ether, among others, and inorganic finely divided materials like barium sulfate, talc, highly dispersed silica (Aerosil or Cabosil), and calcium carbonate, among others. Preferably, methyl cellulose (Tylose) is employed as the dispersing agent in amounts from 0.01 to 10% by weight, particularly 0.1% by weight, based on the amount of the acroleins to be polymerized.

It is also possible to produce polymer beads of copolymers of acrolein and other vinyl monomers when the special polymerization conditions according to the invention are employed. Suitable vinyl monomers are methyl methacrylate, styrene, acrylonitrile, vinyl acetate and acrylic acid esters among others. It is necessary in this copolymerization, producing copolymer beads, to add besides the alkaline catalyst previously mentioned another catalyst, dictated by the type of vinyl monomer employed. Examples of these additional catalysts are organic or inorganic peroxides or persulfates, such as hydrogen peroxide and azoisobutyric nitrile among other radical producing catalyst type.

It was found that the size of the resulting beads is not only dependent on the type and amount of dispersing agent employed, as well as velocity of stirring, as is known in other bead polymerization processes, but also dependent on the ratio or proportions of the acrolein to the water employed. An equal proportion of acrolein and water produces large beads; and the more water that is used in proportion to acrolein the smaller the beads are, other conditions of the polymerization remaining the same. The amount of water employed may be between 30 and 70% by volume of the batch to be polymerized. Thus by varying the amount of water, the size of the beads may be varied within wide ranges. It is possible to obtain bead polymers wherein the diameter of the beads as an average is under 1 micron. The size of the beads can be increased until a bead diameter of over 1 mm. is reached.

The polymer beads of the acrolein are insoluble in ordinary organic solvents as well as oils and fats, even at elevated temperature, but they are very soluble in an aqueous solution of sulfur dioxide. The polymer beads are temperature stable without noticeable decomposition up to 150° C. and over and they do not go through a thermoplastic softening up to such temperature. The thermoplastic and solubility characteristics of the copolymer beads depends on the type of copolymer and the ratio of the monomers employed. The polymer beads according to the present invention are useful as intermediates for the production of films and coating compositions, e.g. in form of a solution in aqueous $SO_2$ in combination with polyvinyl alcohol. The beads themselves can easily be filtered by suction. Their dry substance content is increased and the polymer can be dried. Beads produced by homopolymerization of acrolein are highly reactive. Their molecular weights are within the range of about 800 to 2,000. Copolymer beads according to the invention have an increased molecular weight.

The following examples illustrate but do not limit the process of this invention.

*Example 1*

1 cc. of an aqueous catalyst solution containing 2.5% of highly viscose Tylose (methyl cellulose) and 0.5% piperidine was added to a mixture of 100 cc. of water and 75 cc. of acrolein with stirring at 20° C. After a short induction period a moderately rapid temperature rise followed; 4 minutes from the addition of the catalyst the temperature reached 46° C., the mixture was stirred for 15 minutes and diluted with 1 liter of water. The polymer beads were separated by decanting, and the product filtered with suction, washed with water and acetone and dried on a clay plate in air. 50.5 g. (88% of theoretical) of colorless, uniform polymer beads were obtained, having an average bead diameter of 20 to 50 microns.

Example 2

2.5 cc. of a 1% aqueous piperidine solution were added to a mixture of 60 cc. of water, 75 cc. of acrolein and 5 cc. of a 1% Tylose solution in water with stirring at 20° C. After about 2 minutes a slow temperature rise began, reaching a maximum of 60° C. in 22 minutes. The mixture was stirred for 15 minutes and the product recovered as in Example 1. Yield 39 g. of polyacrolein beads (68% of theoretical) having an average diameter of 200 to 500 microns.

Example 3

100 cc. of a 1% aqueous solution of piperidine were added to a mixture of 120 cc. of water, 150 cc. of acrolein and 10 cc. of 10% Tylose solution in water with stirring at 20° C. A slow temperature rise to a maximum of 62° C. followed. This temperature was reached about 1 hour after adding the catalyst. The mixture was stirred for 15 minutes and the product recovered as in Example 1. Yield 90 g. (79% of the theoretical) of beads, having an average diameter of 50 to 100 microns.

Example 4

2 cc. of a 1% aqueous solution of piperidine were added to a mixture of 100 cc. of water, 75 cc. of acrolein and 15 cc. of a 1% aqueous solution of Tylose with stirring at 20° C. After 9 minutes the temperature was 55° C. After the temperature declined the mixture was stirred for 15 minutes and the product recovered as in Example 1. 42.5 g. (74.5% of theoretical) of acrolein polymer beads are obtained. The average diameter of the beads was 1 to 10 microns.

Example 5

2.5 cc. of a 1% aqueous piperidine solution were added to a mixture of 80 cc. of water, 5 cc. of a 1% aqueous solution of Tylose, 60 cc. of acrolein and 20 cc. of acrylonitrile with stirring at 20° C. Within about 8 minutes the temperature rose to 55° C. When the temperature began to fall, the mixture was stirred for 15 minutes. The product was recovered as in Example 1 yielding 39 g. (61% of theoretical) of acrolein and acrolein and acryonitrile copolymer beads.

Example 6

2.5 cc. of 1% aqueous piperidine solution were added to a mixture of 60 cc. of water, 5 cc. of 1% aqueous Tylose solution, 67.5 cc. of acrolein and 7.5 cc. of methyl methacrylate at 20° C. Within about 3 minutes the temperature rose to 62° C. Stirring was continued 15 minutes more and the product decanted, filtered with suction, washed with water and acetone, and dried as in Example 1 yielding 43 g. (76% of the theoretical) of copolymer beads of acrolein and methyl methacrylate.

Example 7

10 g. of polyacrolein beads obtained after the procedure of Example 4 (dry substance content about 95%) are dissolved in 150 g. of an aqueous $SO_2$ solution ($SO_2$ content 6%) by stirring at a temperature between 30 to 40° C. After 12 hours all beads had dissolved. 10 c. cm. of this solution are combined with a solution of 20 g. polyvinyl alcohol in 80 c. cm. water. From this mixture films and coatings can be produced as known per se, which are insoluble in boiling water.

What is claimed is:
1. The process for preparing a homopolymer of a monomer selected from the group consisting of acrolein, $\alpha$-methyl acrolein and $\alpha$-ethyl acrolein in the form of beads comprising homopolymerizing such monomer in contact with piperidine as sole polymerization catalyst and in contact with water and a dispersing agent, while thoroughly blending the reactants.
2. The process according to claim 1 wherein the quantity of piperidine is 0.001 to 5% by weight of the monomers employed.
3. The process according to claim 1 wherein the dispersing agent is methyl cellulose.
4. The process according to claim 1 wherein the quantity of dispersing agent is 0.01 to 10% by weight of the monomers employed.
5. The process according to claim 1 wherein the quantity of water is 30 to 70% by volume of the batch polymerized.

References Cited by the Examiner
UNITED STATES PATENTS
2,416,536   2/47   Neher et al. _____ 260—73

WILLIAM H. SHORT, *Primary Examiner.*

H. N. BURSTEIN, *Examiner.*